March 27, 1956 G. R. DUNCAN 2,739,568
VACUUM CONTAINER MILKING SYSTEM AND APPARATUS THEREFOR
Filed April 26, 1954 2 Sheets-Sheet 1

INVENTOR
GEORGE R. DUNCAN

BY Mason, Mason & Sheridan

ATTORNEYS

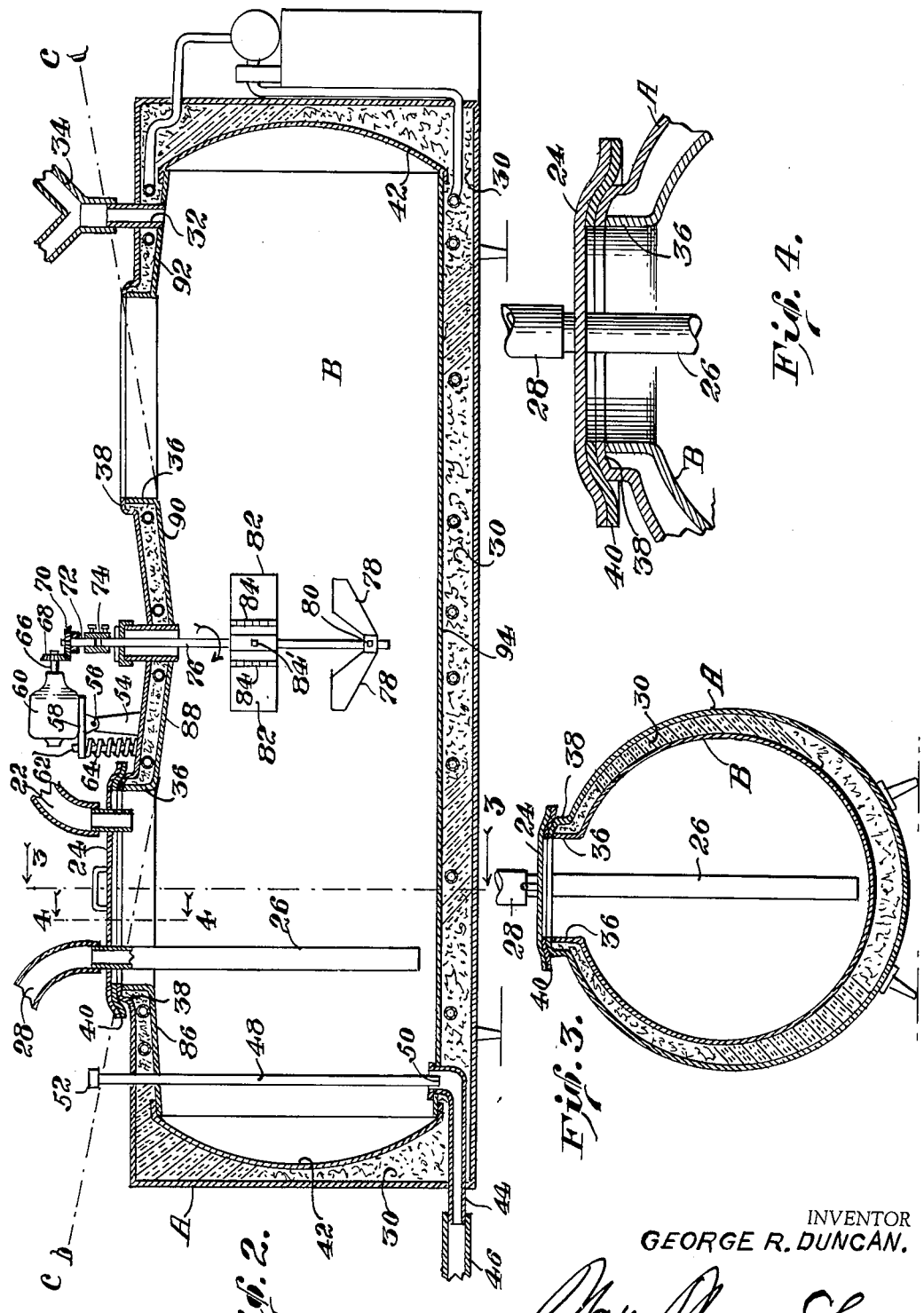

United States Patent Office 2,739,568
Patented Mar. 27, 1956

2,739,568

VACUUM CONTAINER MILKING SYSTEM AND APPARATUS THEREFOR

George R. Duncan, Washington, Mo., assignor to Zero Manufacturing Company, Washington, Mo., a company of Missouri Application April 26, 1954, Serial No. 425,679

5 Claims. (Cl. 119—14.09)

This application is an improvement on the invention described and claimed in Patent No. 2,702,019, granted February 15, 1955, and is particularly concerned with the construction of the bulk milk vacuum tank and the connections thereto, such as the milk and vacuum pipes and other pipe connections.

An object of the invention, therefore, is to improve the construction of the parts of the milking system, so as to improve the efficiency of this system.

An additional object is to provide a system for handling milk whereby the milk is untouched by human hands and is fed directly from the farm animals to a receptacle from whence it may be withdrawn to a milk tank or truck, or to any other receptacle means.

A further object is to provide a milking system, a part of the apparatus of which includes a bulk milk tank of special construction.

Yet another object is to provide in a bulk milk system, an apparatus that includes a tank with means for inspecting the interior of the tank.

Other objects will appear hereinafter throughout the specification.

In the drawings:

Figure 2 is a longitudinal vertical section of the bulk milk tank;

Figure 3 is a vertical section on the line 3—3 of Figure 2; and

Figure 4 is an enlarged vertical section taken on the line 4—4 of Figure 2.

Figure 1:
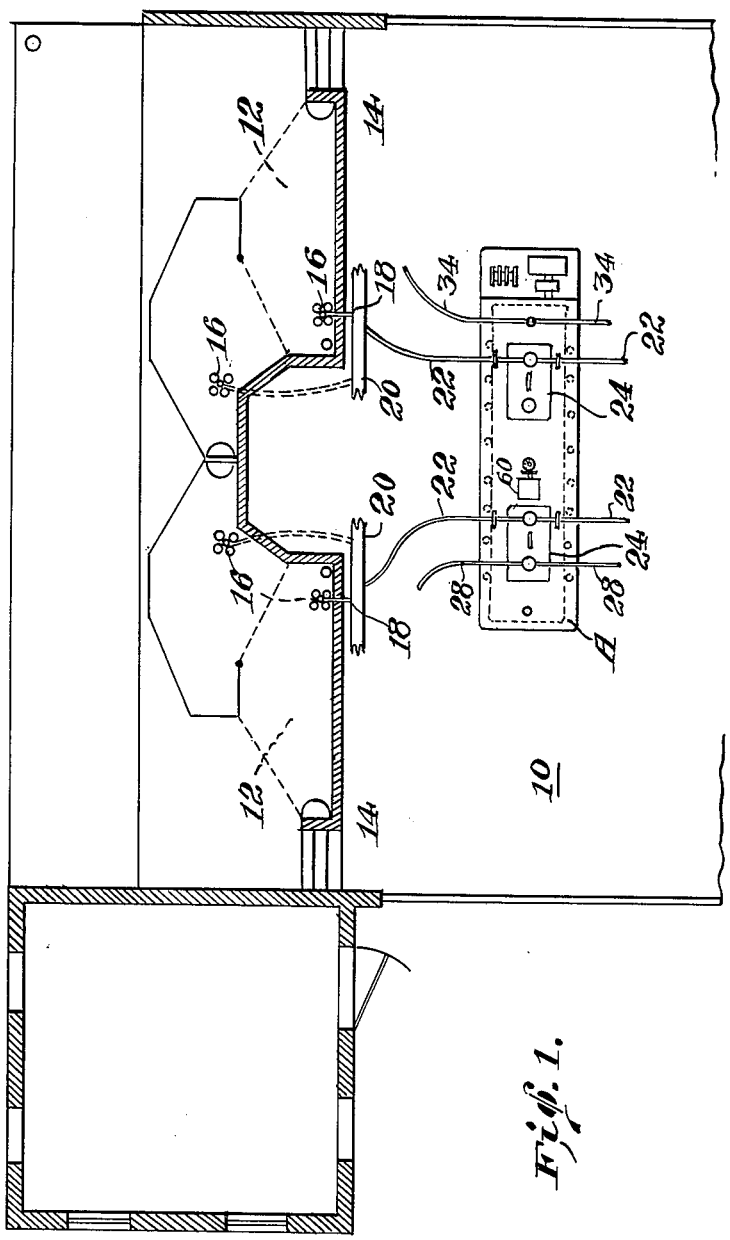
Figure 1 is a diagrammatic illustration of a part of the apparatus of the system.

The laws of sanitation, particularly with regard to the milking and handling of milk as it comes from the cow until the time the milk is placed in a receptacle, such as a quart milk bottle for use by a customer, are in process of continual change. The manufacturers and sellers of dairy equipment, as well as dairymen, are aware of this fact. Dairy equipment is subjected to frequent inspections by Federal and State inspectors. This is for the purpose of insuring that such equipment, as well as its use, shall be such as to insure the production of uncontaminated milk, not only as it applies to the cows themselves, but to the manufacture and use of all equipment for handling milk as it comes from the cow. The present invention relates to a milking system which is well adapted for the maintenance of high standards in the production of milk, whereby uncontaminated milk may be handled in large quantities by dairymen, and by the dairies which receive and bottle the milk from the milk producers or dairymen.

Referring to the drawings, wherein is illustrated an improved dairy barn layout similar to that shown and claimed in my patent noted above, 10 is a space forming part of a milking parlor. The milk cooler is indicated by the letter A. This milk cooler or refrigerator is spaced from the raised platform 12 by a milker's aisle 14. As seen in Figure 1, only part of the layout is shown. As shown in Figure 1, there are provided four sets of teat cups 16, each connected by flexible milking lines or hoses 18 to a longitudinally extending milk pipe line 20 which has been broken away as indicated in Figure 1.

Extending from the milk pipe line are secondary milk hose lines 22, leading to covers 24 of the milk cooler A. In Figure 2, only one secondary milk hose line, and one cover is shown, but it will be understood that the same construction preferably is provided at the right of this figure, as seen in Figure 1.

Extending through one of the covers 24 is a metal pipe 26 whose upper end is connected to a suck-out hose 28. This hose 28 is provided with an end which may be attached to pumping equipment that may be mounted on a truck, whereby to remove the milk from the bulk milk container A.

This container consists of an inner shell B, which is spaced from the outer casing of the milk cooler, the space being preferably filled with insulation 30.

Also extending into the milk cooler through the casing B is a vacuum pipe 32 whose upper end is connected to a flexible hose 34. This vacuum hose is connected to a source of vacuum such as a pump, not shown.

The casing B is preferably provided with a plurality of collars or turned-up portions 36 over which extend the flanges 38 of the collar. A rubber or rubber-like gasket 40 is used to seal each cover 24 in position on one of these flanges.

The inner casing is provided with ends 42 that are semispherical in cross section as shown in Figure 2, and these ends are spaced from the cooler, with the space being filled by insulation 30. The semi-spherical ends are provided in order to allow the casing B interior to withstand minus pressures of from fifteen to twenty-five inches or even higher.

A drain pipe 44 is provided with a conduit 46 in which may be located a valve, not shown. As shown in Figure 2, the contents of the inner casing may be drained when it is desired to clean or inspect the interior thereof. Extending through the cooler casing and inner casing is a blowout pipe 48 having a lower end 50 extending into the pipe 44. When an air hose, not shown, is attached to the upper end 52 of pipe 48, an injector effect may be produced within pipe 44 to clear out the sediment in the lower part of the inner shell B.

Referring to Figure 2, casing A has mounted on it a supporting bracket 54, whose upper end has a pivot 56 for pivotally mounting platform 58 of reversible electric motor 60. One end of the platform is provided with an aperture for the reception of pin 62. The lower end of this pin is fixed to the casing by any suitable means, and it is surrounded by expansible spring 64, which tends to rotate the motor in a clockwise direction about pivot 56.

Shaft 66 of the motor is provided with a bevel gear 68 which meshes with a similar gear 70 on shaft 72. This latter shaft is provided with a coupling 74 for connecting the same to the agitator shaft 76 having agitator blades 78 mounted on the lower end thereof. These blades are mounted on a collar which may be adjustable on the shaft by means of the nut 80. Located above the agitator are the paddle blades 82, each of which is provided with a one way-acting hinge 84. These paddles are mounted on a collar which is also adjustable vertically of the shaft by means of the nut 84.

With this construction, the milk may be agitated with maximum agitation when the motor rotates shaft 76 in one direction. However, when the motor is reversed so as to rotate this shaft in the opposite direction, the paddles 82 will pivot on hinges 84 to reduce the amount of agitation of milk. It will be also understood that the speed of motor 60 will be regulated in either direction of rotation by means of a suitable rheostat, not shown.

One of the most important features of the tank comprises the interior of the inner shell B. Extending from each collar, preferably on all sides thereof, are inclined portions 86, 88, 90, and 92. It will be noted that these inclined portions extend at angles to each other, and that they are also located at an angle with reference to the lower surface 94 of the inner shell B. In other words, these angle or inclined portions provide for an inspection of the upper interior surface of the inner shell by an inspector. An inspector can, at high level, view the undersurfaces forming the angle portions 86, 88, 90, and 92, to determine whether these surfaces are clean, as will be noted by reference to Figure 2 wherein the eyes of the inspector are indicated by reference numeral C. He may, by looking along the dotted line, inspect any one of the interior angle portions 86, 88, 90, and 92.

By referring to Figure 3, it will be noted that the inner shell is of a different curvature than the outer shell of the cooler. Preferably, the outer shell is cylindrical, while the inner shell uncylindrical. Such interior configuration of the inner shell B assists an inspector to make a complete inspection of the milking equipment including all portions of the interior of the inner shell B.

The above description and drawings disclose a single embodiment of the invention, and specific language has been employed in describing the several figures. It will, nevertheless, be understood that no limitations of the scope of the invention are thereby contemplated, and that various alterations and modifications may be made such as would occur to one skilled in the art to which the invention relates.

I claim:

1. In a system for milking a farm animal and for cooling and storing the milk in a bulk receptacle as it comes from the animal, comprising milking means and first conduit means extending therefrom, a milk cooler having insulating walls, a bulk milk vacuum receptacle in said cooler, said bulk milk receptacle being generally cylindrical with ends which are semi-spherical in shape, and having an opening extending through a wall of said cooler, said first conduit means extending into the interior of said bulk milk receptacle, means for cooling said receptacle during the milking operation including a refrigerating means and a second conduit means leading therefrom and having means for cooling said receptacle, whereby the milk in said receptacle may be continuously cooled by the circulation of the refrigerant in said second conduit means, at least during the milking operation, and a third conduit means, said third conduit means extending into said receptacle whereby to maintain a continuous vacuum in said bulk milk receptacle during the milking operation, said bulk milk vacuum receptacle having a portion providing an inner receptacle surface that is inclined in a vertical plane of the receptacle with reference to a line extending longitudinally of the receptacle along the lower longitudinal axis thereof.

2. In a system for milking a farm animal and for cooling and storing the milk in a bulk receptacle as it comes from the animal, comprising milking means and first conduit means extending therefrom, a milk cooler having insulating walls, a bulk milk vacuum receptacle in said cooler, said bulk milk receptacle being generally horizontally cylindrical with ends which are semi-spherical in shape and having an opening extending vertically through said cooler, said first conduit means extending into the interior of said bulk milk receptacle, means for cooling said receptacle during the milking operation including a refrigerating means and a second conduit means leading therefrom and having means for cooling said receptacle, whereby the milk in said receptacle may be continuously cooled by the circulation of the refrigerant in said second conduit means at least during the milking operation, and a third conduit means, said third conduit means extending into said receptacle whereby to maintain a continuous vacuum in said bulk milk receptacle at least during the milking operation, said bulk milk vacuum receptacle having portions providing inner receptacle surfaces that are inclined in a vertical plane of the receptacle with reference to a line extending longitudinally of the receptacle along the lower longitudinal axis thereof.

3. In a system for milking a farm animal and for cooling and storing the milk in a bulk receptacle as it comes from the animal, comprising milking means and first conduit means extending therefrom, a milk cooler having insulating walls, a bulk milk vacuum receptacle in said cooler, said bulk milk receptacle being generally cylindrical with ends which are semi-spherical in shape, and having an opening extending through a wall of said cooler, said first conduit means extending into the interior of said bulk milk receptacle through said portion, means for cooling said receptacle during the milking operation including a refrigerating means and a second conduit means leading therefrom and having means for cooling said receptacle, whereby the milk in said receptacle may be continuously cooled by the circulation of the refrigerant in said second conduit means at least during the milking operation, and a third conduit means, said third conduit means extending into said receptacle whereby to maintain a continuous vacuum in said bulk milk receptacle at least during the milking operation, and means for agitating the milk in said bulk milk receptacle, said bulk milk vacuum receptacle having a portion providing an inner receptacle surface that is inclined in a vertical plane of the receptacle with reference to a line extending longitudinally of the receptacle and along the lower longitudinal axis thereof, said opening being located adjacent to said inner receptacle surface.

4. In a system for milking a farm animal and for cooling and storing the milk in a bulk receptacle as it comes from the animal, comprising milking means and first conduit means extending therefrom, a milk cooler having insulating walls, a bulk milk vacuum receptacle in said cooler, said bulk milk receptacle being generally horizontally cylindrical with ends which are semi-spherical in shape, said first conduit means extending into the interior of said bulk milk receptacle and into said vacuum receptacle, means for cooling said receptacle during the milking operation including a refrigerating means and a second conduit means leading therefrom and having means for cooling said receptacle, whereby the milk in said receptacle may be continuously cooled by the circulation of the refrigerant in said cooling means of said second conduit means at least during the milking operation, and a third conduit means, said third conduit means extending through said milk cooler and into said bulk milk vacuum receptacle whereby to maintain a continuous vacuum in said bulk milk receptacle at least during the milking operation, and means for agitating the milk in said bulk milk receptacle, said means for agitating the milk including a reversible electric motor and a shaft and blades driven by said motor, said blades being pivotally mounted whereby to present larger surface areas to the milk when rotated in one direction than when rotated in the opposite direction, upon the reversal of said motor.

5. In a system for milking a farm animal and for cooling and storing the milk in a bulk receptacle as it comes from the animal, comprising milking means and first conduit means extending therefrom, a milk cooler having insulating walls, a bulk milk vacuum receptacle in said cooler, said bulk milk receptacle being generally cylindrical with ends which are semi-spherical in shape, and having an opening extending through a wall of said cooler, said first conduit means extending into the interior of said bulk milk receptacle through said opening, means for cooling said receptacle during the milking operation including a refrigerating means and a second conduit means leading therefrom and having a pipe for cooling said receptacle, whereby the milk in said receptacle may be continuously cooled by the circulation of the refrigerant in said metallic portion of said second conduit means at least during the milking operation, and a third conduit means, said third conduit means extending into said receptacle through said receptacle opening whereby to maintain a continuous vacuum in said bulk milk receptacle at least during the milking operation, said milk receptacle opening including a neck extending through the said milk cooler, a cover for said neck, said first conduit means and third conduit means extending through said cover, said bulk milk vacuum receptacle having a portion providing an inner receptacle surface that is inclined in a vertical plane of the receptacle with reference to a line extending longitudinally of the receptacle and along the lower longitudinal axis thereof, said neck being located adjacent said inclined portion.

References Cited in the file of this patent

UNITED STATES PATENTS

| | | |
|---|---|---|
| 1,925,877 | Mitchum | Sept. 5, 1933 |
| 1,987,917 | Thwaits | Jan. 15, 1935 |
| 2,024,639 | Greene | Dec. 17, 1935 |
| 2,320,531 | Mojonnier | June 1, 1943 |
| 2,512,094 | Duncan | June 20, 1950 |
| 2,557,252 | Bannister et al. | June 19, 1951 |
| 2,576,050 | Soden | Nov. 20, 1951 |
| 2,617,264 | McGovern et al. | Nov. 11, 1952 |
| 2,631,566 | Roop | Mar. 17, 1953 |
| 2,691,282 | Snelson | Oct. 12, 1954 |